United States Patent Office 3,502,881
Patented Mar. 24, 1970

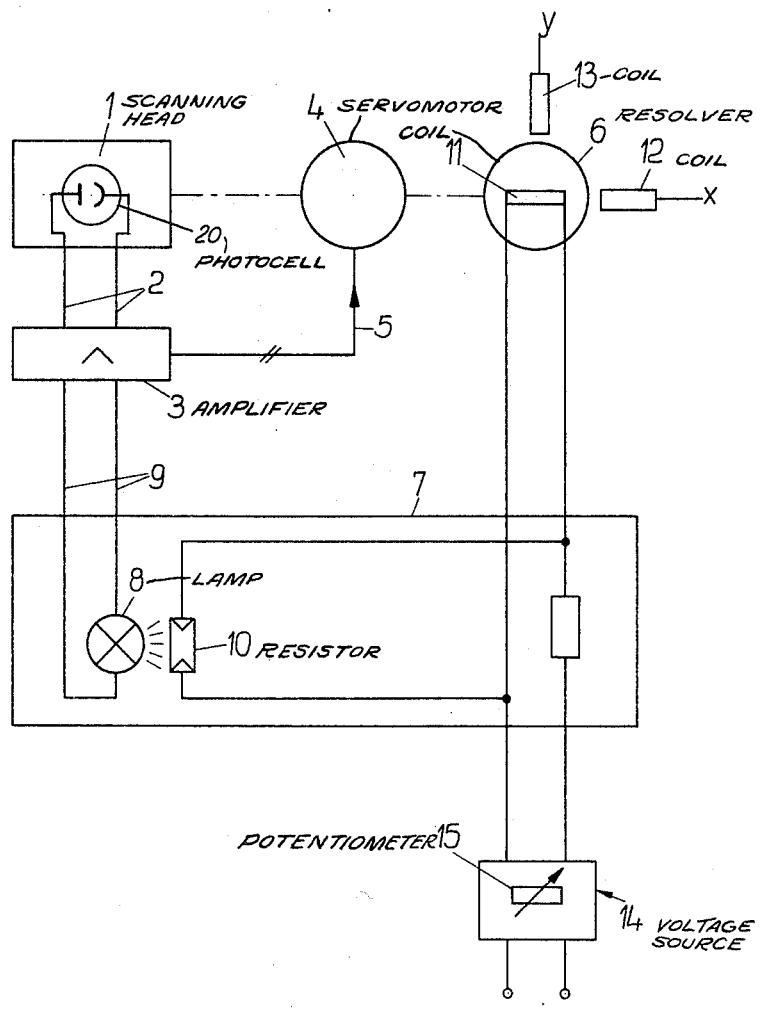

3,502,881
TORCH CUTTING FOLLOWER CONTROL DEVICE
Gunter Hahn, Hausen, Germany, assignor to Messer Griesheim G.m.b.H., Frankfurt am Main, Germany, a corporation of Germany
Filed May 25, 1967, Ser. No. 641,288
Claims priority, application Germany, May 27, 1966,
M 69,649
Int. Cl. G05b 1/00, 11/00; H01j 39/12
U.S. Cl. 250—202         9 Claims

ABSTRACT OF THE DISCLOSURE

A follower control device for torch cutting machines having a photoelectric device for scanning a drawing or pattern which emits signals for controlling the adjustment of the scanning device and the movable part of the operating machine, includes a correction device which changes the feed speed of the adjusting device by means of a regulating member such as a countervoltage source or a changeable series or parallel resistor switched in the operating or control current of the feed members for affecting their current supply in accordance with the output signals of the scanning device.

BACKGROUND OF INVENTION

Known follower control devices or other copying arrangements incorporate a differential photoelectric resistor whereupon the curve or line to be reproduced is formed and, according to the relative position, compensates a bridge of which two members are formed by the differential photoeletcric resistor. This controls the scanning head and an instrument, such as a cutting torch, coupled directly or indirectly with the scanning head.

The scanning heads of known arrangements usually have photoelectric devices where the curve to be reproduced is formed on the photoelectric cell with the help of an optical system. The periodic scanning is effected with a rotating or eccentrically arranged optical system by moving the light ray or by means of a vibrating mirror system. The type and construction of the scanning head for producing the control signals for an adjusting device are immaterial as concerns this invention.

The control signals produced by means of the scanning head are used primarily for direction-true adjustment of the scanning head to the course of the curve to be reproduced. Devices of this type are known wherein the control signals produced in the scanning head regulate the relative speed between the scanning head and the curve to be reproduced and thus also the relative speed of an instrument as compared to a work piece, to thereby insure that the scanning head can follow more intense curvatures of the beam without going over the beam. One such device (see German published application 1,143,911 which corresponds to U.S. Patent 3,017,552) includes, beside a first photoelectric cell for the producing of a scanning signal, a second photoelectric cell which is spatially arranged opposite the first photoelectric cell in such a manner that with it a beam or the like is scanned at a point situated in the feed direction before the scanning point for the main photoelectric cell. This photoelectric cell delivers an isolated control signal which, independent of the control signal of the main photoelectric cell, reaches the isolated brake device which in turn changes the feed speed of the adjusting device—in this instance the rate of revolutions of two so-called coordinate motors.

The use of an isolated leading scanning member has the disadvantage that a change of the speed of the adjusting movement takes place relatively early, hence the instrument is decelerated prior to the critical processing place where a deceleration would not yet be required. In profile iron with numerous curvatures of the profile iron line to be followed, for example in cutting gears or gear blanks from a metal plate by means of a cutting torch, allowances must be made for the lengthening of the processing time because of this premature deceleration. This disadvantage is not solely based on the fact that both photoelectric cells of the scanning head are spatially separated from each other, so that this disadvantage could be eliminated solely by the closest possible arrangement of the photoelectric cells, but it resides also in the fact that the control of the adjusting speed results completely independent of the control signal of the main photoelectric cell which determines the directional change of the scanning head. In this connection in very intense curvatures of the curve to be reproduced, a regulation of the adjusting movement can practicably take place up to a standstill by the effect of the prescanning photoelectric cell, which in some processing instruments such as cutting torches is inadmissible, since this would lead to an undesired enlargement of the cutting nozzle or to an interruption of the autogeneous cut by cold blowing of the melted metal.

SUMMARY OF INVENTION

The object of this present invention is to provide an adjusting device which is changeable in accordance with the intensity of the direction change of a curve to be reproduced.

A further object of this invention is the use of an adjusting device on torch cutting machines which eliminates abrupt falling off the feed speed.

The above disadvantages are avoided by the present invention in that the correction device employed effects a change of the feed speed of the adjusting device with the aid of a regulating member, for example a countervoltage source or a changeable series or parallel resistor, switched in the operating or control current of the feed member or feed members and affecting their current supply depending on the output signals of the actual scanning device. A separate scanning member is thus avoided. In the use of an electro-optical scanning device, both the direction change as well as the speed of the adjusting movement are regulated with a single photoelectric cell and the signals delivered by it.

Inventively, the regulating member is preferably constructed non-linearly and can be, at the same time, an amplifier.

By sensitivity of the inventive follower control, the cutting speed can be increased by at least 50% while maintaining the by-passable radii or while maintaining the cutting speed, small radii are circumscribed.

In a preferred embodiment of the correction device, a light transmitter, operated dependent on the output signals of the scanning device, and a photoelectric structural element affected by it are used as the regulating member, for example a photoelectric resistor which can be switched directly into the operating or controlling current of the feed member or members. In this connection, the sensitivity can be easily changed and suited to the processing tool used in that the light transmitter is operated with a preferably adjustable polarizing potential or initial potential which superimposes the preferably preamplified output voltage of the scanning device. In using an incandescent lamp as the light transmitter, the response factor can be brought to a desired value by the adjustment of a certain basic brightness of the lamp.

The adjusting control device according to the invention is independent of the type of adjusting device. In adjusting devices with an impeller, the correction device can affect the feed control amplifier, while in the often used adjusting devices with two coordinate servomotors, the correction device is switched in the operating or controlling circuit of the resolver (sine-cosine-transmitter) series connected to this motor.

By the use of a nonlinear regulating member, the adjusting speed is not linearly synchronized with the intensity of the curvature of the curve to be reproduced but instead approximates a certain minimum speed.

THE DRAWING

The single figure shows a schematic diagram of a control device in accordance with one embodiment of this invention.

DETAILED DESCRIPTION

A photoelectric scanning head 1 produces control signals in a conventional manner which characterize the relative position of the scanning head opposite a curve to be reproduced and which are conveyed by means of lines 2 of an amplifier stage 3. The construction of the scanning head is not shown in more detail. Since it is immaterial its details are not necessary for an understanding of the invention. Head 1 is coupled with a servomotor 4 in a conventional manner which directs the photoelectric cell 20 of the scanning head 1, corresponding to the furnished control signals which are supplied to it from amplifier 3 by means of line or conduit 5, in the changing direction of the curve to be reproduced. Servomotor 4 is furthermore connected with a resolver 6, known per se, which divides the adjusting movement of motor 4 into an x and a y component.

According to the present invention, the control equipment includes a correction device 7 which has a light transmitter in the form of an incandescent lamp 8, to which the amplifier control signal is supplied from intensifier 3 by way of circuits 9 and there causes a brightness fluctuation in accordance with the size of the control signal. In the embodiment shown, incandescent lamp 8 is exclusively supplied control signals. Preferably, however, the light transmitter is set at a certain initial potential which is superimposed by the control signal voltage incoming by way of circuit 9. The changing light intensity of the incandescent lamp 8 causes in a known manner a change in the output resistance in a photoelectric resistor 10 situated in its beam range. The photoelectric resistor 10 is placed parallel to the rotor coil 11 of resolver 6, and the coil inductively cooperates with both x and y stator coils 12 and 13 of resolver 6, on a rated voltage source 14 determining the feed speed of the x and y servomotors connected with stator coils 12 and 13 of resolver 6. In rated voltage source 14 a maximum rated voltage can be adjusted—for example by means of a designated potentiometer 15. By changing the photoelectric resistor 10 depending on the brightness of incandescent lamp 8, the flow of current and likewise the current supply of the x and y coordinate motors are changed by the rotor coil 11 of resolver 6, to effect the adjustment of the scanning head 1 in a conventional manner. Thus the speed of the adjusting movement of these motors is changed.

Instead of a relatively low-resistant, light-sensitive resistor 10, a very high-resistant photoelectric member, for example a photoelectric cell, can also be used which furnishes a voltage dependent on the brightness of the incandescent lamp 8 which voltage is directed opposite to the voltage furnished by the rated voltage source 14, whereby the voltage is changed at the rotor coil 11 of resolver 6, in accordance with the brightness of the light transmitter 8 and thus in accordance with the intensity of the control signals 2 which are proportional to the intensity of the direction deviation of the curve to be reproduced. In such a manner depending on the direction change of the curve to be reproduced there results a more or less extensive deceleration and after resultant change in direction again an increasing acceleration of the adjusting movement. In this connection, the nonlinear characteristic curve of a photoelectric resistor or of a photoelectric cell can be utilized in a suitable manner. By a corresponding measurement of the fundamental brightness of the light transmitter 8, the working point of the correction device is placed in the vicinity of the upper break of the characteristic curve of the photoelectric cell or of photoelectric resistor 10, so that in very intense control signals which designate a very intense curvature of the curve to be reproduced, the operating point of the correction device is moved only to the weakly rising asymptotic upper characteristic curve branch of the photoelectric cell, so that only a negligible voltage increase and accordingly only a negligible nonlinear weakening of the rated voltage supplied by step 14. This thereby prevents a cutting torch being so intensely decelerated that an even material outflow at the cutting point is disturbed.

A follower control according to the present invention achieves an extremely quick regulation of the power supplied to the resolver for the operation of both coordinate motors and a relatively quick change of the adjusting movement of the scanning head. A second, independently operating auxiliary scanning member, such as in the known follower control devices, with the above-named disadvantages is avoided. It is essential that, for regulating the adjusting speed, the adjusting signal given by the scanning head is immediately utilized. Theoretically, it would be feasible to have also an individual regulation of the adjusting speed of the x and y coordinate motors. For this, however, the signals given by the scanning head could no longer be immediately utilized; instead signals depending on the position of the resolver 6 would have to be used. These signals, however, could only be achieved after the adjusting of resolver 6 by control motor 4, whereby the acoustic sensitivity of such equipment is considerably impaired as compared to the present follower control device.

What is claimed is:

1. In a torch cutting follower control device having
    (a) a photoelectric scanning head comprising,
    (b) a photoelectric cell for scanning a pattern and which gives signals for regulating the scanning head by,
    (c) means of an adjusting device for the scaning head and the movable part of the torch,
    (d) said photoelectric cell being the sole photoelectric cell in said scanning head,
    (e) the adjusting device having feeding means and
    (f) correction means for influencing the movement of the scanning head and the torch, said correction means comprising a,
    (g) light transmitter means and,
    (h) a receiving device in the form of a photoelectric cell,
    (i) said correction means photoelectric cell being connectable in the operating circuit of said scanning head photoelectric cell and said,
    (k) receiving device being connected parallel to the operating circuit of said feeding means, whereby said correction means,
    (l) effects a change in the feed speed of said adjusting device, developed by the signals of said scanning head photoelectric cell.

2. A device as set forth in claim 1 wherein said correction means includes a nonlinear regulating member in the form of an amplifier which is affected by the output signals of said scanning head.

3. A device as set forth in claim 1 wherein said light transmitter means is operated with an adjustable polarizing potential which superimposes preamplified output voltage of said scanning head.

4. A device as set forth in claim 1 wherein said light transmitter means is an incandescent lamp.

5. A device as set forth in claim 1 wherein said light transmitter means is a glow discharge tube.

6. A device as set forth in claim 1 including an impeller for operating said adjusting device, a feed regulating amplifier, and said correction means affecting said feed regulating amplifier.

7. A device as set forth in claim 1 wherein said adjusting device includes at least two coordinate servomotors, a resolver in the form of a sine-cosine transmitter being series connected with the servomotor, and said correction means being switched in the operating circuit of said resolver.

8. A device as set forth in claim 1 wherein said correction means includes a countervoltage source.

9. A device as set forth in claim 1 wherein said correction means includes a changeable series and parallel resistor.

References Cited

UNITED STATES PATENTS

| 3,017,552 | 1/1962 | Brouwer | 250—202 X |
|---|---|---|---|
| 3,322,952 | 5/1967 | Jewell | 250—202 |

FOREIGN PATENTS

| 1,123,741 | 2/1962 | Germany. |
|---|---|---|

JAMES W. LAWRENCE, Primary Examiner

C. R. CAMPBELL, Assistant Examiner

U.S. Cl. X.R.

250—206, 208